US010176264B2

(12) United States Patent
Lehodey et al.

(10) Patent No.: US 10,176,264 B2
(45) Date of Patent: Jan. 8, 2019

(54) GENERATING TOPIC PAGES BASED ON DATA SOURCES

(71) Applicant: Microsoft Technology Licensing, LLC, Redmond, WA (US)

(72) Inventors: Isabelle Lehodey, Seattle, WA (US); Christian Gschwend, Seattle, WA (US); Amanda Diane Flanders, Greenfield, MN (US); Joel Schaeffer, Fort Mill, SC (US); John James Spilker, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 409 days.

(21) Appl. No.: 14/955,522

(22) Filed: Dec. 1, 2015

(65) Prior Publication Data

US 2017/0154114 A1    Jun. 1, 2017

(51) Int. Cl.
*G06F 17/30* (2006.01)

(52) U.S. Cl.
CPC .. *G06F 17/30867* (2013.01); *G06F 17/30011* (2013.01); *G06F 17/3053* (2013.01); *G06F 17/30905* (2013.01)

(58) Field of Classification Search
CPC ......... G06F 17/30867; G06F 17/30011; G06F 17/3053
USPC ........................................................ 707/706
See application file for complete search history.

(56) References Cited

U.S. PATENT DOCUMENTS

| | | | |
|---|---|---|---|
| 6,829,599 B2 | 12/2004 | Chidlovskii | |
| 8,065,290 B2 | 11/2011 | Hogue | |
| 8,229,960 B2 | 7/2012 | Nie et al. | |
| 8,655,866 B1 | 2/2014 | Provine et al. | |
| 8,682,647 B1 | 3/2014 | Lee | |
| 8,819,007 B2 | 8/2014 | Brown et al. | |
| 8,838,628 B2 | 9/2014 | Leighton et al. | |
| 8,954,412 B1 | 2/2015 | Zhao et al. | |
| 8,990,246 B2 | 3/2015 | Donmez et al. | |
| 9,092,495 B2 | 7/2015 | Hogue et al. | |

(Continued)

OTHER PUBLICATIONS

"International Search Report and Written Opinion Issued in PCT Application No. PCT/US2016/063716", Dated: Feb. 10, 2017, 10 Pages.

(Continued)

*Primary Examiner* — Grace Park
*Assistant Examiner* — Jessica N Le
(74) *Attorney, Agent, or Firm* — Workman Nydegger

(57) ABSTRACT

A database of technical support calls, or queries received for technical support, is used to identify popular topics for an entity such as a company. The topics may be issues related to products provided by the company such as software. Relevant information is collected for each topic from internal sources (such as knowledge bases or other technical publications) and external sources (such as webpages or online forums). The information is used to create topic pages for each topic that are meant to provide information related to the topic, as well as guide users to resources where additional information for the topic can be obtained. The generated topic pages are encoded using a schema that is recognizable by search engines so that the contents of the topics pages can be presented by the search engines directly in a search results page.

20 Claims, 8 Drawing Sheets

(56) References Cited

U.S. PATENT DOCUMENTS

| | | | |
|---|---|---|---|
| 9,110,977 B1 | 8/2015 | Pierre et al. | |
| 9,734,208 B1* | 8/2017 | Goldstein | G06Q 10/10 |
| 9,754,036 B1* | 9/2017 | Gabrilovich | G06F 17/30867 |
| 2009/0106203 A1 | 4/2009 | Shi et al. | |
| 2011/0125739 A1* | 5/2011 | Wexler | G06F 17/30867 |
| | | | 707/734 |
| 2012/0221583 A1 | 8/2012 | Kulack et al. | |
| 2014/0052645 A1* | 2/2014 | Hawes | G06Q 10/20 |
| | | | 705/304 |
| 2014/0173350 A1* | 6/2014 | Roy | G06F 11/006 |
| | | | 714/37 |
| 2014/0245141 A1* | 8/2014 | Yeh | G06F 9/4446 |
| | | | 715/708 |
| 2015/0006492 A1* | 1/2015 | Wexler | G06F 17/30554 |
| | | | 707/694 |
| 2016/0232222 A1* | 8/2016 | McCloskey | G06F 17/30598 |
| 2016/0283948 A1* | 9/2016 | Snapir | G06Q 30/02 |
| 2017/0124174 A1* | 5/2017 | Starr | G06F 17/30598 |

OTHER PUBLICATIONS

Bernstein, et al., "Direct Answers for Search Queries in the Long Tail", In Proceedings of the SIGCHI Conference on Human Factors in Computing Systems, May 5, 2012, 10 pages.

\* cited by examiner

Search Results 165

405

How to speed up a slow computer
    To speed up a computer try the following:
        Add extra RAM
        Have at least 15% free space on C drive
        Uninstall unnecessary applications
        Disable startup applications
        Close tabs

To find out more information try the following links:
    How to disable start up applications
    Tips to identify unnecessary applications
    Discussion Thread – Best way to increase my speed?

View videos on speeding up your computer:
    Step by step way to speed up computer
    Watch me make by computer work faster

For more information please contact:
    help@techcorp.com

410

1. Speed up my computer – free download
2. Tips on speeding up your computer
3. Why is my computer so slow?
4. Best and worst ways to fix your computer speed
5. Top ten ways to make your computer faster
6. Experts guide to a faster computer
7. Pro tips for the fastest computer around
8. When should I upgrade my computer?
9. Great deals on a new computer
10. Computer coupons!

*FIG. 4*

GENERATING TOPIC PAGES BASED ON DATA SOURCES

BACKGROUND

When a user needs help with a topic, such as a software application, the user typically submits a query to a search engine that summarizes the topic. For example, a user having problems with a formatting issue in a word processing application named "Foo" may submit the query "How to do I turn on paragraph numbering in Foo?"

In response, the user may receive search results from the search engine that include links to a variety of webpages from a variety of sources that are responsive to the query. Continuing the example above, the search results may include links to publications about the Foo word processing application that are authored or hosted by the entity that created the application, links to publications by experts or other entities that are not affiliated with the entity that created the word processing application, as well as links to threads on forums or other webpages where users discuss the word processing application and problems and solutions regarding the word processing application.

There are several drawbacks in users finding answers in this way. For example, in order to find an answer, the user may have to visit each of the webpages identified in the search results and read through possibly lengthy publications or discussion threads. Additionally, the user may find conflicting solutions to his question and may lack sufficient information to resolve the conflict. Further, because of a disconnect between how the user chooses to characterize the topic, versus the more technical characterization of the topic that may be used in publications or by experts, the answers that are returned in the search results may not be well tailored to the question provided by the user. Moreover, if the user is unable to find an answer in response to the query, the user may call or directly contact technical support to the resolve the issue, which may be costly to the entity associated with the topic.

SUMMARY

A database of technical support calls, or queries received for technical support, is used to identify popular topics for an entity such as a company. The topics may be issues related to products provided by the company such as software. Relevant information is collected for each topic from internal sources (such as knowledge bases or other technical publications) and external sources (such as webpages or online forums). The information is used to create topic pages for each topic that are meant to provide information related to the topic, as well as guide users to resources where additional information for the topic can be obtained. The generated topic pages are encoded using a schema that is recognizable by search engines so that the contents of the topics pages can be presented by the search engines directly in a search results page.

In an implementation, a support database is received by a computing device through a network. The support database comprises a plurality of records. Each record is associated with a topic of a plurality of topics, and the support database is associated with a first entity. A subset of the topics of the plurality of topics is selected based on the plurality of records by the computing device. For each topic of the subset of the plurality of topics: one or more first documents corresponding to the topic are identified by the computing device, wherein the one or more first documents are associated with the first entity; one or more second documents corresponding to the topic are identified by the computing device, wherein the one or more second documents are associated with a second entity; and a topic page is generated for the topic using content from the identified one or more first documents and content from the identified one or more second documents by the computing device. Each of the generated topic pages is provided to a search engine through the network by the computing device.

In an implementation, a topic is received by a computing device through a network. The topic is associated with a first entity. One or more first documents corresponding to the topic are identified by the computing device. The one or more first documents are associated with the first entity. One or more second documents corresponding to the topic are identified by the computing device. The one or more second documents are associated with a second entity. A template is retrieved by the computing device. The template comprises a first region and a second region. Content from the identified one or more first documents is inserted into the first region of the template by the computing device. Content from the identified one or more second documents is inserted into the second region of the template by the computing device. A topic page is generated from the template by the computing device. The generated topic page is provided to a search engine through the network by the computing device.

In an implementation, a system for selecting topics based on technical support data and for generating topic pages for each selected topic using documents from a first entity and documents from a second entity is provided. The system comprises at least one computing device, and a support database associated with a first entity. The support database comprises a plurality of records, and each record is associated with a topic of a plurality of topics; and a topic engine. The topic engine is adapted to: rank the topics of the plurality of topics based on the records of the support database, and select a subset of the topics of the plurality of topics based on the ranking. The topic engine is further adapted to, for each topic of the subset of topics: identify one or more first documents corresponding to the topic, wherein the one or more first documents are associated with the first entity; identify one or more second documents corresponding to the topic, wherein the one or more second documents are associated with a second entity; and generate a topic page for the topic using content from the identified one or more first documents and content from the identified one or more second documents. The topic engine is further adapted to provide each of the generated topic pages to a search engine through a network.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings:

FIG. 4 is an illustration of an implementation of exemplary search results generated by a search engine that includes content extracted from a topic page;

DETAILED DESCRIPTION

Figure 1:
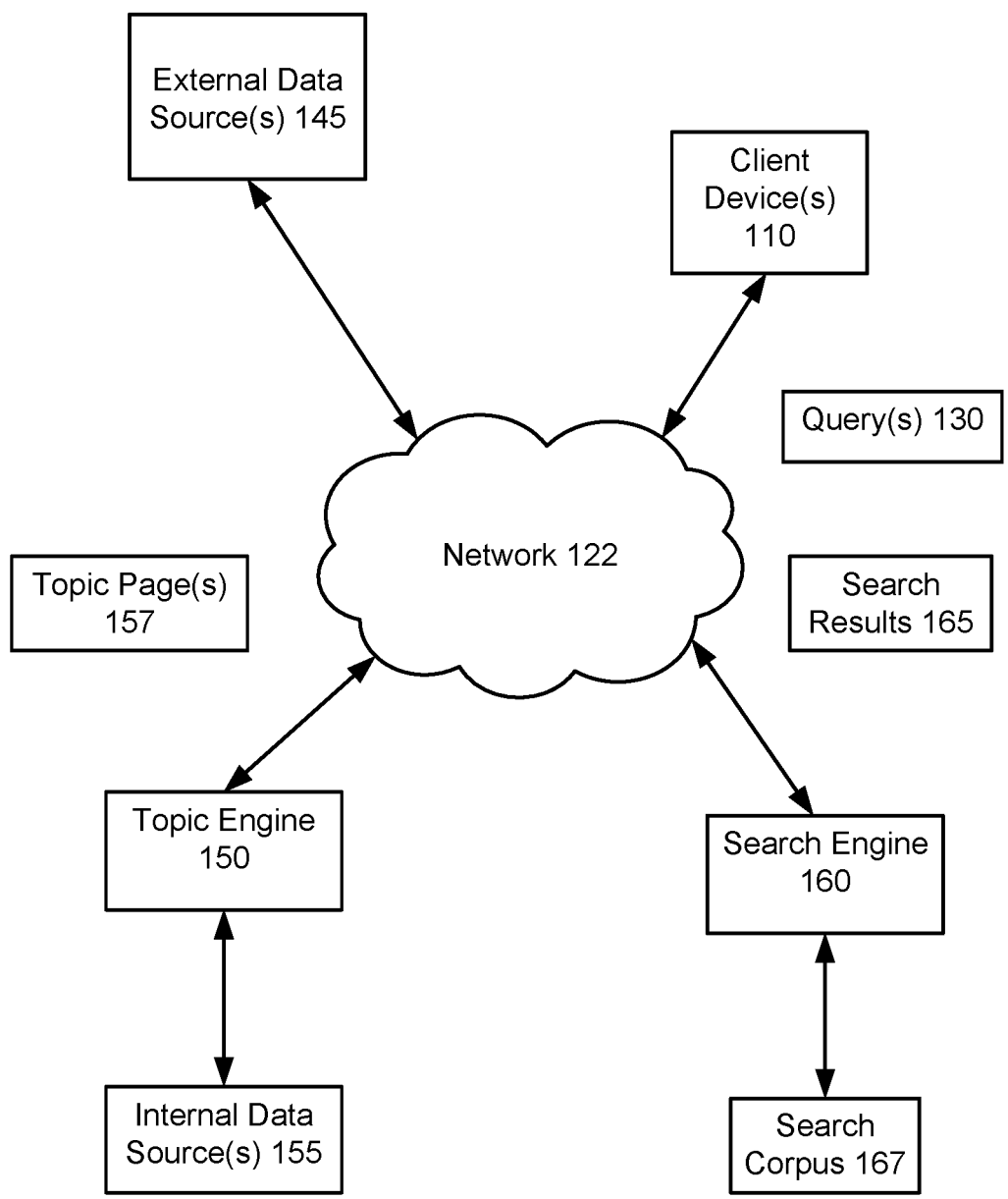
FIG. 1 is an illustration of an implementation of an exemplary environment for generating topic pages for topics based on internal and external data sources.

FIG. 1 is an illustration of an implementation of an exemplary environment 100 for generating topic pages for topics based on internal and external data sources. The environment 100 may include a search engine 160, a topic engine 150, external data source(s) 145, internal data source(s) 155, and client device(s) 110 in communication through a network 122. The network 122 may be a variety of network types including the public switched telephone network (PSTN), a cellular telephone network, and a packet switched network (e.g., the Internet). Although only one topic engine 150, internal data source 155, external data source 145, search engine 160, and client device 110 are shown in FIG. 1, there is no limit to the number of topic engines 150, internal data sources 155, external data sources 145, search engines 160, and client devices 110 that may be supported.

Figure 8:
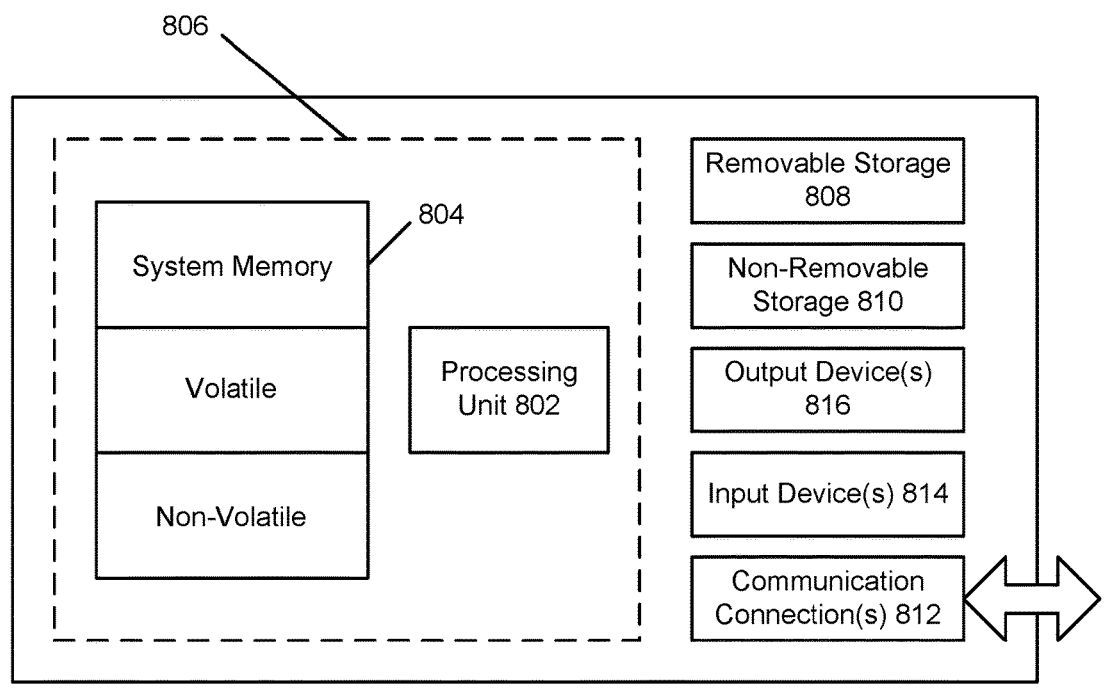
FIG. 8 shows an exemplary computing environment in which example embodiments and aspects may be implemented.

The topic engine 150, internal data sources 155, external data sources 145, search engine 160, and client device 110 may be implemented together or separately using a general purpose computing device such as the computing device 800 described with respect to FIG. 8. Example computing devices include a smart phone, a tablet computer, a laptop computer, a set-top box, a personal/digital video recorder, or any other type of computing device.

The client device 110 may generate one or more queries 130. A query 130 may include terms or keywords that may indicate the type or content of content items that a user associated with the client device 110 is interested is receiving. Each query 130 may be generated by an application executed by the client device 110 such as a web browser. Other types of applications may be supported and may depend on the type of content items that the user is interested in. Examples of types of content items that may be supported include, but are not limited to, webpages, documents, images, videos, video games, e-books, and contacts, for example.

In some implementations, the client device 110 may provide a query 130 to the search engine 160. The search engine 160 may be configured to identify content items available across multiple content item providers (e.g., webservers, publishers, databases, or other sources such as the client devices 110 themselves) in response to received queries 130. In some implementations, the search engine 160 may fulfill the received queries 130 using data stored in a search corpus 167. The search corpus 167 may comprise an index of the content items available at each of the various content item providers along with text from the content items, keywords associated with the content items, and/or metadata associated with the content items.

The search engine 160 may fulfill a received query 130 by searching the search corpus 167 for content items that are likely to be responsive to the query 130. For example, the search engine 160 may match terms of the query 130 with the keywords, text, or metadata associated with the content items. Identifiers of the matching content items may be provided to the client device 110 in response to the query 130 as search results 165. The identifiers of the matching content items may include universal resource locators ("URLs"). Other types of identifiers may be used.

As described above, users of client devices 110 often generate queries 130 that correspond to questions related to a particular topic. Rather than rely on the search engine 160 to assemble a set of search results 165 that include links to websites that are relevant to a topic corresponding to a query 130, the topic engine 150 may generate a plurality of topic pages 157 that are each specifically tailored to a topic and may be generated using data from the external data sources 145 and internal data sources 155.

Each topic page 157 may be generated using a schema that can be recognized and indexed by the search engine 160, such that the search engine 160 can provide search results 165 that include a topic page 157 in response to a query 130 that is associated with the topic corresponding to the topic page 157. Depending on the implementation, the contents of the topic page 157 may be provided by the search engine 160 directly in the search results 165 so that the user of the client device 110 can view some or all of the content of the topic page 157 without having to select or click on any of the links included in the search results 165.

The topic engine 150 may be associated with an entity. For example, the entity may be a manufacturer of software or other products. The topics associated with an entity may correspond to the products or services provided by the entities or may correspond to particular issues or questions that users may have regarding products or services provided by the entity. Examples of entities may include companies, universities, organizations, etc. Each entity may be associated with its own topic engine 150, or multiple entities may share a single topic engine 150.

Figure 2:
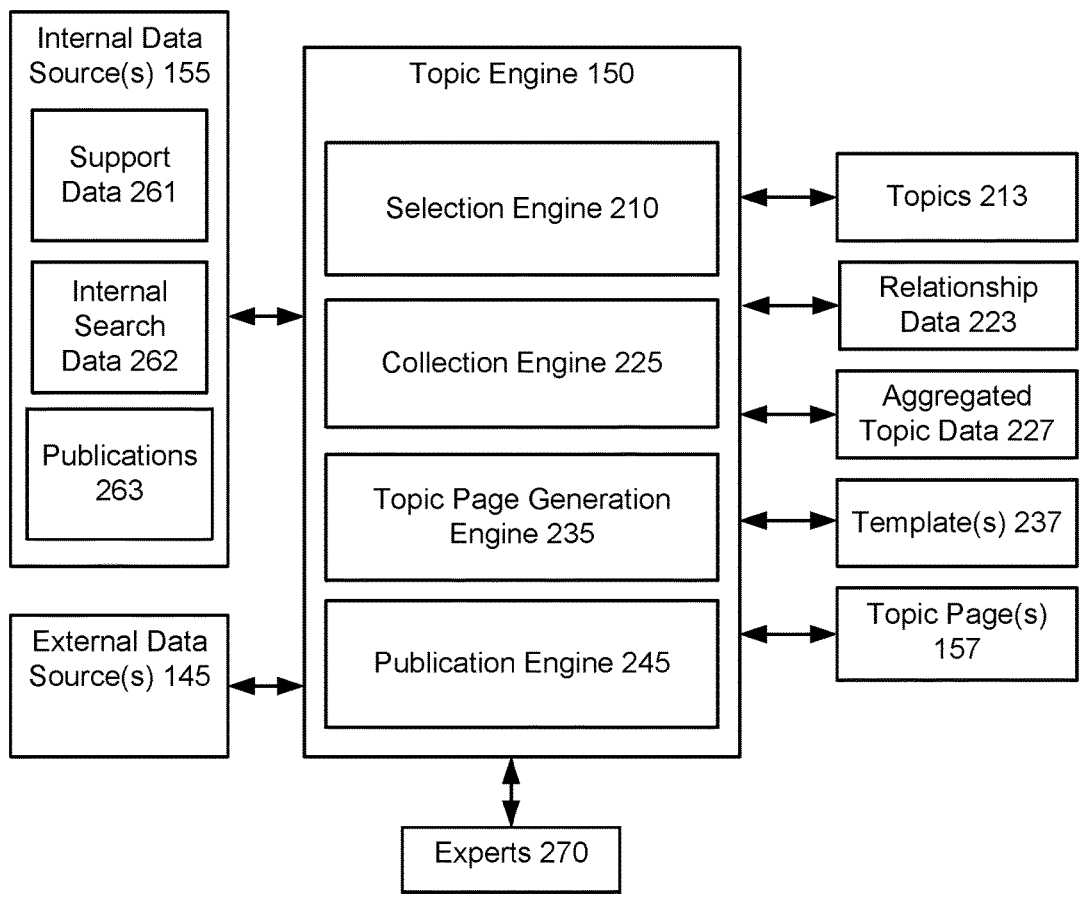
FIG. 2 is an illustration of an implementation of an exemplary topic engine.

As described further with respect to FIG. 2, the topic engine 150 may generate a topic page 157 for a topic for an entity by combining data from internal data sources 155 with data from external data sources 145 for the topic. The internal data sources 155 may include data sources that are associated with the entity and may include data sources that are controlled by the entity, published by the entity, hosted by the entity, or stored by the entity. Examples of internal data sources may include technical manuals or publications associated with a topic, help pages associated with a topic, promotional or marketing materials associated with a topic, etc.

The external data sources 145 may include data sources that are associated with or controlled by an entity that is different than the entity that is associated with the internal data sources 155. A data source that is not an internal data source 155 may be considered an external data source 145. Examples of external data sources 145 may include forums or message boards associated with the topic, third-party publications about the topic, etc.

Depending on the implementation, the topic engine 150 may extract content related to a particular topic from the internal data sources 155 and external data sources 145, and may use the extracted content to generate a topic page 157 for the topic. The topic page 157 may be generated automatically by the topic engine 150 using the extracted content, or in combination with one or more human authors or reviewers. Regardless of how a topic page 157 is generated, some or all of the content of the topic page 157 may be reviewed by an expert associated with the topic to ensure that the contents of the topic page 157 are accurate before the topic page 157 is provided to the search engine 160.

Generating topic pages 157 by an entity provides several advantages. First, because the entity generates the topic page 157 that is presented to a user by a search engine 160 with the search results 165, the entity may better control the content that is presented for a topic to avoid the user being confused by incorrect or incomplete information associated with the topic that may be included in the search results 165. The entity may further eliminate negative or incorrect content related to the topic that may be present in external data sources 145, such as forums or message boards.

Second, by structuring the topic page 157 such that the search engine 160 can include content from the topic page 157 directly in the search results 165, the user that generated the query 130 can quickly locate information related to the topic without having to click or select any of the links provided in the search results 165. By quickly providing the user with the information that they are searching for, the likelihood that the user will become frustrated with the product or service associated with the topic is lowered. In addition, the likelihood that the user will call or contact technical support directly is reduced.

FIG. 2 is an illustration of an implementation of an exemplary topic engine 150. The topic engine 150 may include one or more components including a selection engine 210, a collection engine 225, a topic page generation engine 235, and a publication engine 245. More or fewer components may be included in the topic engine 150. Some or all of the components of the topic engine 150 may be implemented by one or more computing devices such as the computing device 800 described with respect to FIG. 8.

The selection engine 210 may select the topics 213 that will be used to generate the topic pages 157. The selection engine 210 may select a subset of topics 213 associated with an entity, such as the most popular topics. For example, where the entity is a software company, the selection engine 210 may select topics 213 that correspond to the questions most frequently received by technical support. The number of topics 213 selected in the subset may be specified by a user or an administrator.

The selection engine 210 may select a subset of topics 213 using internal data sources such as support data 261 and internal search data 262. The support data 261 may comprise a support database and may include records corresponding to support issues received by the entity from users. Each record may represent an interaction between the entity and a customer or a user with respect to a support issue. For example, each record may represent a telephone call or an e-mail to a technical support department associated with the entity for a support issue. Each support issue may be considered a topic 213.

Each record may further identify terms or phrases used by the user when describing the support issue, and an indication of how the support issue was solved. Depending on the implementation, each record may include a link or reference to an internal document or publication 263 that includes a solution to the support issue.

The internal search data 262 may comprise a database of queries 130 received by an internal search engine 160 associated with an entity, and may include a search history for each query such as the webpages and/or publications 263 that were viewed by users who submitted the queries 130. An example of an internal search engine 160 is the search functionality exposed by many websites that restrict users to search for content specific to the website or the entity associated with the website. This is in contrast with typical search engines 160 that may allow users to search all of the content available on the Internet and indexed in the search corpus 167.

The support data 261, alone or in combination with the internal search data 262, may be used by the selection engine 210 to select the subset of topics 213. For example, the selection engine 210 may count the number of records in the support data 261 and internal search data 262 that correspond to each topic 213, and may rank the topics 213 based on the counts. The highest ranked topics may be selected for the subset by the topic engine 150. Alternatively, the selection engine 210 may select topics 213 for the subset that have more than a threshold number of associated records in the support data 261. Other method for selecting a subset of topics 213 may be used.

The collection engine 225 may, for each topic 213 in the selected subset, collect data or content related to the topic 213 from the internal data sources 155 and the external data sources 145 to generate aggregated topic data 227. Depending on the implementation, the collection engine 225 may generate the aggregated topic data 227 based on relationships between the topics 213 and the various data sources as indicated by relationship data 223. The relationship data 223 may include records for each topic 213 and indications of the particular internal data sources 155 and external data sources 145 that include content that is relevant to the topic 213.

For example, the relationship data 223 for a topic 213 may include links to the publications 263 that describe the topic 213 and/or a solution to the topic 213, or may include links to external data sources 145 related to the topic such as particular websites or discussion threads where the topic 213 is discussed. The relationship data 223 may further include links to video content or audio content related to each topic 213. For example, users may generate videos or recordings where they explain how to solve a particular topic 213.

The relationship data 223 may further identify experts 270 associated with each topic 213. The experts 270 may be users who are known to be authoritative on a particular topic 213. The relationship data 223 on a particular expert 270 may include contact information associated with the expert 270 such as an e-mail address, a telephone number, an associated webpage, etc.

The relationship data 223 for a topic 213 may be determined by the collection engine 225 and/or one or more human reviewers. For example, the collection engine 225 may generate and submit queries 130 related to the topic 213 to a search engine 160 to identify relevant external data sources 145 such as articles or discussion threads. The collection engine 225 may also use the support data 261 and/or internal search data 262 to identify publications 263 or other internal data sources 155 that may be relevant to the topic 213. After the relationship data 223 has been automatically collected by the collection engine 225, it may be reviewed and/or added to by the one or more human reviewers. The one or more human reviewers may be users or administrators who are knowledgeable regarding the topic 213, for example.

The topic page generation engine 235 may generate the topic page 157 for a topic 213 using the aggregated topic data 227. The topic page generation engine 235 may generate the topic page 157 by combining some or all of the aggregated topic data 227 using one or more template(s) 237. Depending on the implementation, a template 237 may include multiple regions or areas that are configured to receive and display different types of aggregated topic data 227. The template 237 may be written using a schema that is understood and supported by a search engine 160 such as XML, HTML, RDF schema, or schema.org, for example.

Figure 3:
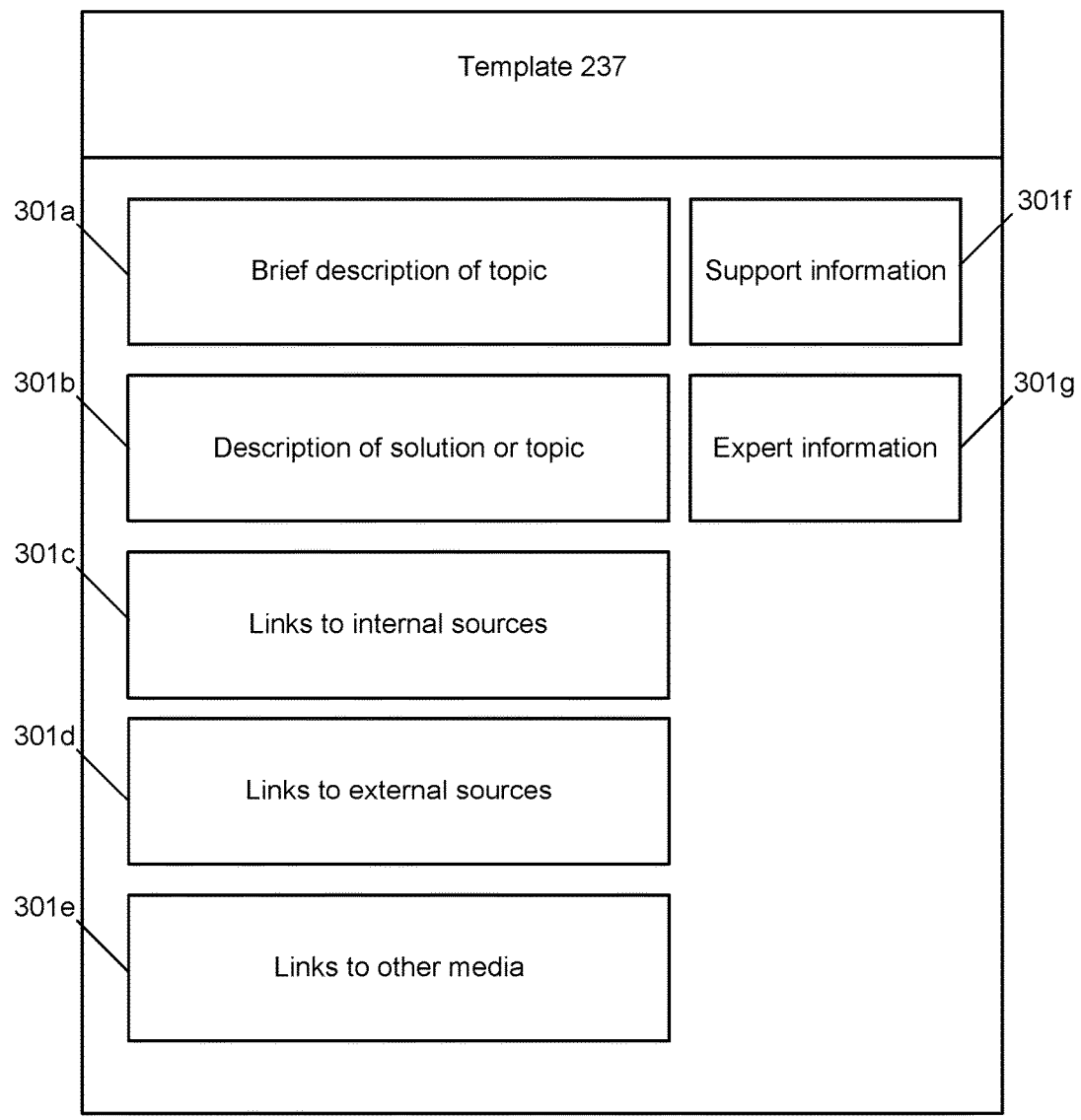
FIG. 3 is an illustration of an implementation of an exemplary template.

FIG. 3 is an illustration of an implementation of an exemplary template 237 that may be used by the topic page generation engine 235 using the aggregated topic data 227. As shown, the template 237 includes several regions 301a-g, with each region 301 being designated to include different content. More or fewer regions 301 may be supported, and different templates 237 may include different arrangements of the regions 301 than the arrangement shown in FIG. 3.

The region 301a is adapted to display a "Brief description of topic." This region may include the name of the topic 213, or may include a brief summary. The description may be automatically determined by the topic page generation engine 235 from the aggregated topic data 227. Alternatively, the description may be determined by a human reviewer from the aggregated topic data 227.

The region 301b is adapted to display a "Description of solution or topic." This region may display the solution to the topic 213 when the topic 213 is a technical support type topic 213, or may display a more detailed description of the topic 213 when the topic 213 is more of a general request for information. The description may be automatically determined by the topic page generation engine 235 from the aggregated topic data 227. For example, the region 301b may be populated using content from the aggregated data 227 that was extracted from a technical support publication 263 associated with the topic, or may be populated by content extracted from the support data 261 related to the topic 213. Depending on the implementation, the content for the region 301b may also be provided and/or edited by a human reviewer.

The region 301c is adapted to display "Links to internal sources." This region may display links or references to internal data sources 155 such as publications 263 that are relevant to the topic 213. The publications 263 may provide a more detailed description of the topic than the information provided in the region 301b.

Similarly, the region 301d is adapted to display "Links to external sources." This region may display links or references to external data sources 145 that are relevant to the topic 213. The links may include references to threads or message board discussions that include relevant and correct information related to the topic 213.

The region 301e is adapted to display "Links to other media." The "other media" may include links to the video content, audio content, or other content that is relevant to the topic 213.

The regions 301f and 301g display "Support information" and "Expert information", respectively. The support information in the region 301f may include information such as email addresses or phone numbers that may be used to contact the entity associated with the topic 213. For example, the region 301f may include a telephone number for a technical support hotline of the entity associated with the topic. The expert information in the region 301g may identify experts 270 that are associated with the particular topic 213. Depending on the implementation, the experts 270 may include both experts associated with the entity (i.e., internal experts) and experts that are not associated with the entity (i.e., external experts). The expert information may include telephone numbers, email addresses, social networking accounts, and any other contact information that may be associated with each expert 270.

FIG. 4 is an illustration of an implementation of exemplary search results 165 generated by a search engine 160 that includes content extracted from a topic page 157. As described above, the topic page 157 that is generated using the template 237 is formatted such that the information provided in the various regions 301 can be extracted by the search engine 160 and displayed to the user in the search results 165.

In the example shown, a user may have generated and submitted a query 130 similar to "How do I speed up my computer?" to a search engine 160. In response to the query 130, the search engine 160 may have generated the search results 165 that includes links to relevant content items or websites. These links are shown in a portion 410.

In addition, the search engine 160 may have identified a topic page 157 corresponding to a topic 213 of "How to speed up a slow computer." Accordingly, the search engine 160 has extracted some or all of the content of the identified topic page 157 and has presented the extracted content in a portion 405.

As shown, under the heading "How to speed up a slow computer", the portion 405 includes instructions that may be followed by the user to speed up their computer. This information may have been extracted by the search engine 160 from the region 301b of the template 237, for example.

Under the heading "To find out more information try the following links", the portion 405 includes multiple links to websites. These websites may be both internal data sources 155 and external data sources 145, and the links may have been extracted by the search engine 160 from the regions 301c and 301d of the template 237, for example.

Under the heading "View videos on speeding up your computer", the portion 405 includes multiple links to videos. The links to the videos may have been extracted by the search engine 160 from the region 301e of the template 237, for example.

Under the heading "For more information please contact," the portion 405 includes an email address that may be used to reach out to the entity associated with the topic 237 to request additional help. The email address may have been extracted by the search engine 160 from the region 301f of the template 237, for example.

As may be appreciated, by providing relevant content, links and other information about a topic 213 in a results page 157 to a search engine 160 by an entity, the entity is better able to control the information users receive about a particular topic 213 even when the users are receiving the information from a search engine 160 not affiliated with the entity.

For example, as shown in FIG. 4, the content in the portion 405 that is provided by the entity is shown in the top of the search results 165, while the links that were selected by the search engine 160 are shown below the portion 405 in the portion 410. Thus, a user viewing the search results 165 is likely to view and consider the content in the portion 405 before viewing any of the content in the portion 410.

Moreover, much of the content in the portion 405 is immediately available to the user to view upon loading the search results 165, whereas the user may have to take the additional step of clicking or selecting one of the links in the portion 410 to view any of the content associated with the portion 410. In addition, in the event that the user is not satisfied with the solution or description provided in the portion 405, the user may be more likely to interact with one of the links in the portion 405 because they are above the links provided in the portion 410.

Returning to FIG. 2, the publication engine 245 may provide the generated topic pages 157 for each selected topic 213 to one or more search engines 160. Depending on the implementation, the publication engine 245 may provide the topic pages 157 directly to the search engines 160, or may provide the topic pages 157 by making them available to the search engines 160 for indexing. For example, the publication engine 245 may make the topic pages 157 available by publishing the topic pages 157 in a region of a webpage associated with the entity that is indexed by search engines 160.

Depending on the implementation, before the publication engine 245 provides or publishes a topic page 157, the publication engine 245 may first associate the topic page 157 with keywords that may be used by the search engines 160 to determine when the topic page 157 is responsive to a query 130. The publication engine 245 may use the internal search data 262 and/or the support data 261 corresponding to the topic 213 associated with the topic page 157 to generate the keywords.

The internal search data 262 and support data 261 may include the terms or phrases that are provided by the users when looking for help on a particular topic 213, and therefore such terms or phrases may be useful when selecting the keywords to associate with a topic page 157. For example, users looking for help with a topic such as "adding or removing bullet points" may use phrases such as "get rid of dots from documents." The terms and phrases typically used when describing a topic 213 may be useful for generating the keywords, especially where the terms and phrases used are different than the terms and phrases used to describe the topic by the entity.

In addition, before a generated topic page 157 is published to the search engines 160, the generated topic page 157 may first be reviewed by one or more experts 270. A single expert 270 may review the topic page 157, and may either approve the topic page 157 or may make one or more edits to the contents of the topic page 157. Alternatively, multiple experts 270 may be asked to review or provide edits to a proposed topic page 157.

Figure 5:
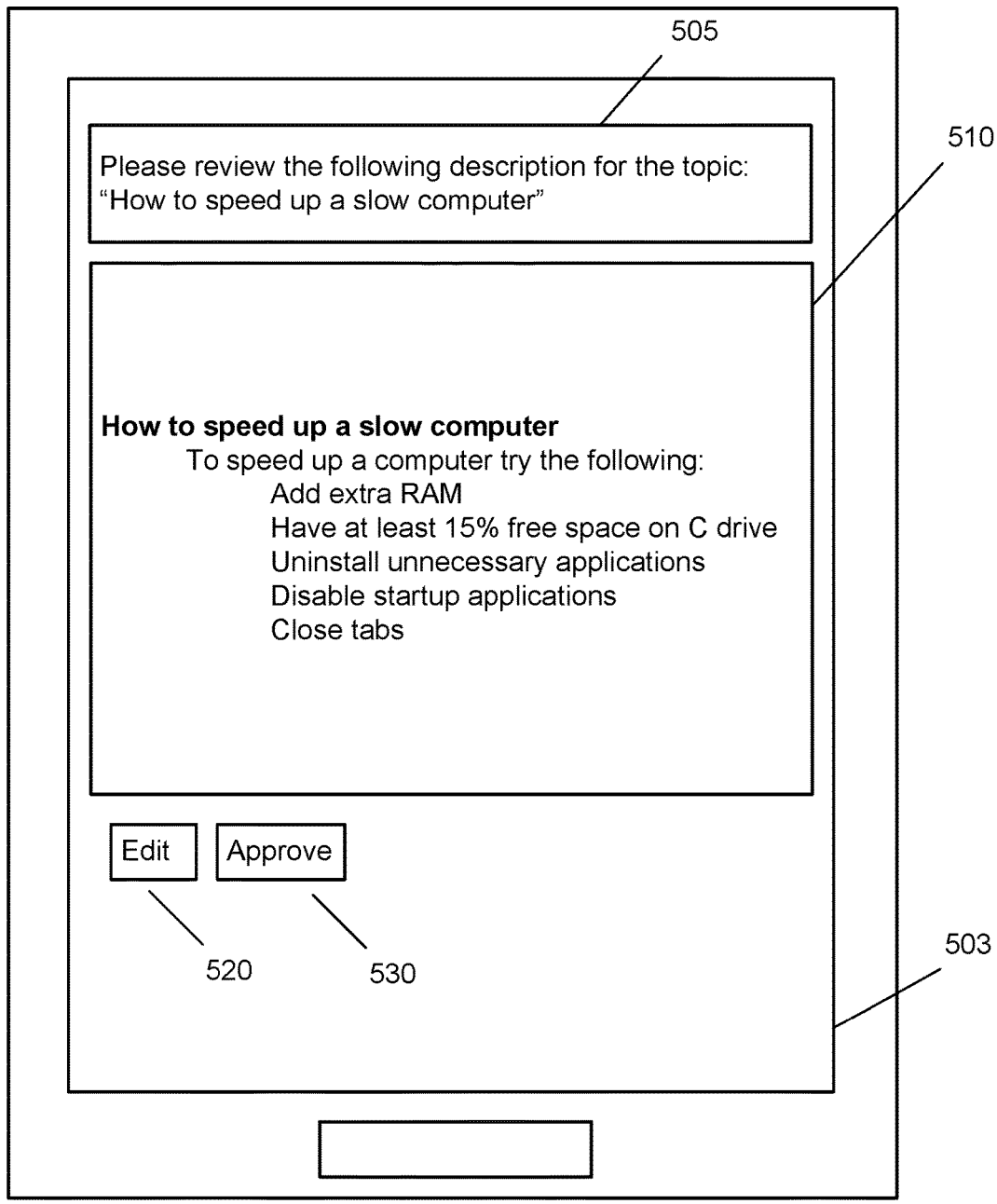
FIG. 5 is an illustration of an implementation of an exemplary smart phone that may be used by an expert to review or edit a topic page.

FIG. 5 is an illustration of an implementation of an exemplary smart phone 500 that may be used by an expert to review or edit a topic page 157. In the example shown, an expert 270 is viewing content for a proposed topic page 157 on a user interface 503 displayed by the smart phone 500. In a region 505 of the user interface 503, the expert 270 is asked to review content for the topic page 157 corresponding to the topic 213 of "How to speed up a slow computer." Some proposed content for the topic page 157 is displayed to the expert in a region 510 of the user interface 503. The expert 270 may approve the content displayed in the region 510 by selecting the button 530 labeled "Approve", or may edit the proposed content by selecting the button 520 labeled "Edit."

Figure 6:
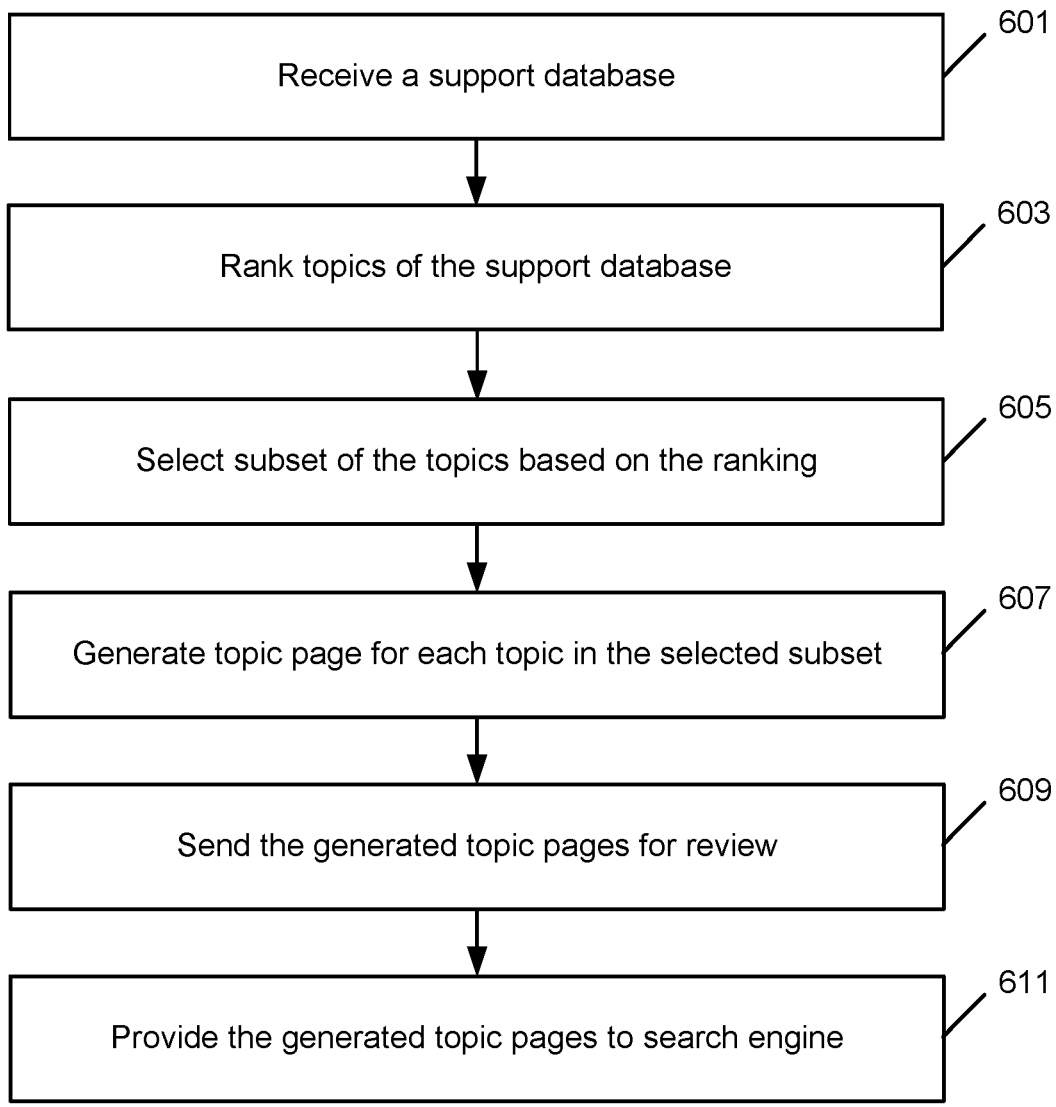
FIG. 6 is an operational flow of an implementation of a method for generating topic pages and for providing topic pages to search engines.

FIG. 6 is an operational flow of an implementation of a method 600 for generating topic pages and for providing topic pages to search engines. The method 600 may be implemented by the topic engine 150.

At 601, a support database is received. The support database may be associated with a first entity and may be received by the selection engine 210 of the topic engine 150. The support database may be the support data 261 and may include a plurality of records. Each record may be associated with a topic 213, and may be a record of a support interaction between the first entity associated with the support database and a user or client regarding the topic 213. For example, the topic 213 may be a problem with a word processing application, and the record may describe a call between a customer and the first entity regarding the problem with the word processing application.

At 603, the topics from the support database are ranked. The topics 213 of from the support database may be ranked by the selection engine 210 based on the records of the support database. For example, the selection engine 210 may count the number of records in the support database that are associated with each topic 213, and may rank the topics 213 based on the counts.

At 605, a subset of the topics of the support database is selected. The subset of the topics 213 may be selected by the selection engine 210 of the topic engine 150. The subset may include the highest ranked topics 213 from the support database. The number of topics 213 selected may be specified by a user or an administrator. In some implementations, the topics 213 selected for the subset may be selected based on a threshold number of associated records in the support database. For example, the topics 213 in the subset may be any topic 213 having more than ten, twenty, or thirty associated records in the support database.

At 607, a topic page is generated for each topic in the selected subset. The topic page 157 for a topic 213 may be generated by the topic page generation engine 235 using content from one or more first and second documents that are associated with the topic 213. Depending on the implementation, first documents may include documents that are internal to, or controlled by, the first entity associated with the topic 213. Examples of first documents may include webpages or websites associated with the entity, and support publications associated with the entity. Second documents may include documents that are internal to, or controlled by, a second entity that is different than the first entity. Examples of second documents may include webpages or websites such as third-party forums or message boards. The first and second documents associated with a topic 213 may be identified using relationship data 223, for example.

Content from the first and second documents may be used by the topic page generation engine 235 to generate the topic page 157 for a topic 213 along with a template 237. Depending on the implementation, the template 237 may have one or more regions or portions that are adapted to receive different types of content from the first and second documents. The template 237 with the inserted content may be stored by the topic page generation engine 235 as the topic page 157. Each topic page 157 may be stored using a schema that is recognizable by one or more search engines 160, and that allows the one or more search engines 160 to extract content from the topic pages 157.

At 609, the generated topic pages are sent for review. The generated topic pages 157 may be sent for review to one or more experts 270 or administrators associated with the first entity corresponding to each topic page 157. Depending on the implementations, the experts 270 or administrators may either approve the topic pages 157, or may edit some or all of the content associated with the topic pages 157.

At 611, the generated topic pages are provided to a search engine. The generated topic pages 157 may be provided to a search engine 160 by the publication engine 245. Depending on the implementation, the publication engine 245 may provide the topic pages 157 by publishing the topic pages 157 on a webpage or website that is indexed by the search engine 160. Other methods may be used.

Figure 7:
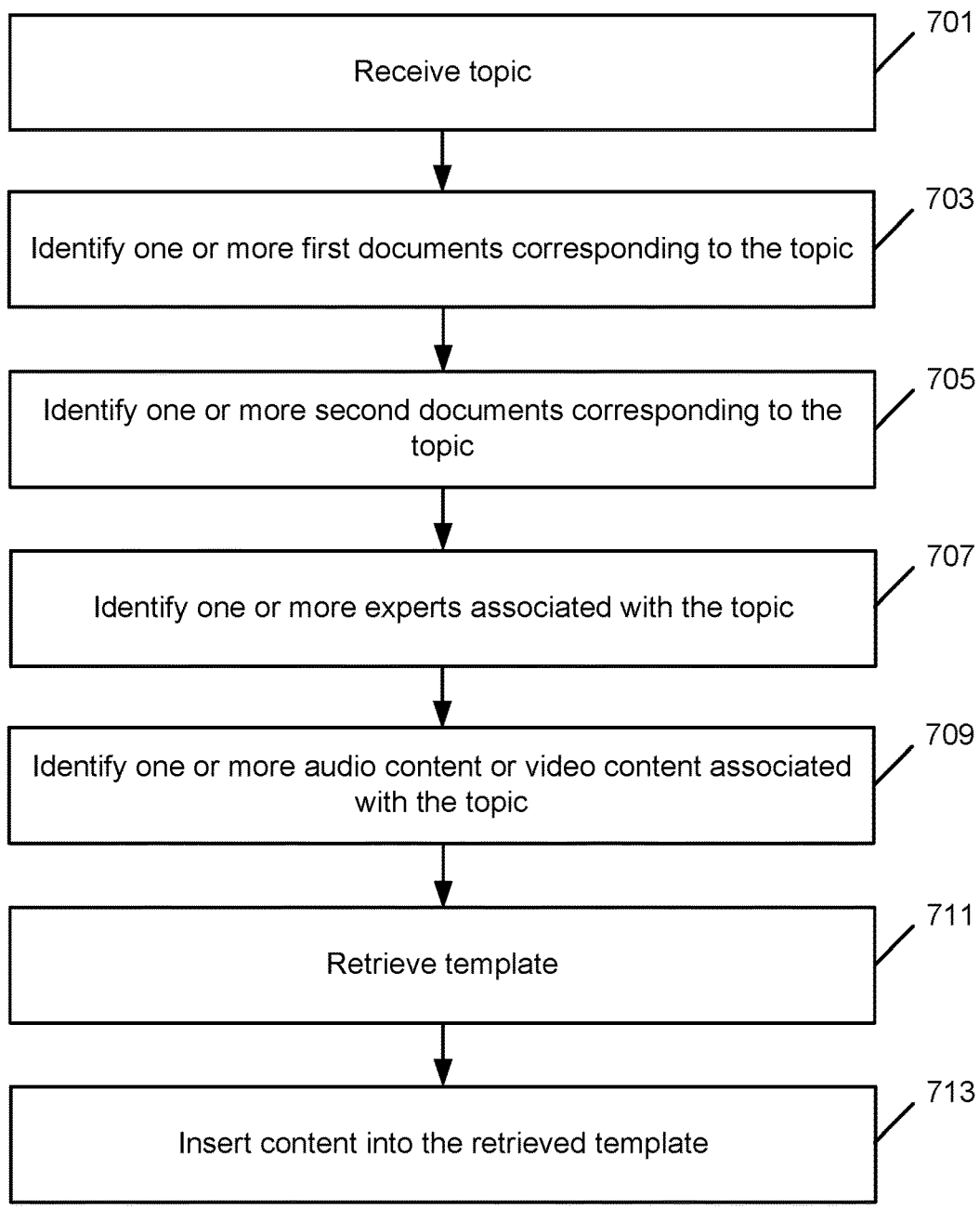
FIG. 7 is an operational flow of an implementation of a method for generating a topic page for a topic.

FIG. 7 is an operational flow of an implementation of a method 700 for generating a topic page for a topic. The method 700 may be implemented by the topic engine 150.

At 701, a topic is received. The topic 213 may be received by the collection engine 225. The topic 213 may be associated with a first entity such as a corporation, and may correspond to a product or a service provided by the first entity. For example, the first entity may be car manufacturer, and the topic 213 may be a service issue associated with one of the cars provided by the car manufacturer.

At 703, one or more first documents corresponding to the topic are identified. The one or more first documents may be identified by the collection engine 225 based on information from the relationship data 223. The first documents may be documents that are under the control of the first entity. Continuing the car manufacturer example described above, the first documents may include car manuals published online by the first entity that describe the issue that corresponds to the topic 213.

The relationship data 223 may include links or references to first documents that are associated with the topic 213. The relationship data 223 may have been generated by searching for documents that include one or more keywords associated with the topic 213, or may have been generated by a user or an expert 270 that is familiar with the topic 213.

At 705, one or more second documents corresponding to the topic are identified. The one or more second documents may be identified by the collection engine 225 based on information from the relationship data 223. The second documents may be documents that are under the control of a second entity that is different than the first entity. Continuing the car manufacturer example described above, the second documents may include enthusiast publications that are published by the second entity, or message boards hosted by the second entity where issues similar to the topic 213 are discussed.

At 707, one or more experts associated with the topic are identified. The one or more experts 270 may be identified by the collection engine 225. Depending on the implementation, the experts 270 associated with the topic 213 may be identified using the relationship data 223. The experts 270 may include experts that are affiliated or associated with the first entity, and experts that are affiliated with the second entity.

At 709, one or more of audio content or video content associated with the topic is identified. Depending on the implementation, the audio content or video content associated with the topic 213 may be identified using the relationship data 223. The audio content or video content may include instructional videos or recordings made with respect to the content. The audio content or video content may have been generated by users or experts 270 affiliated or associated with the first entity or the second entity.

At 711, a template is retrieved. The template 237 may be retrieved by the topic page generation engine 235.

At 713, content is inserted to the retrieved template. The content may be inserted into the template 237 by the topic page generation engine 235. The content may be extracted from one or more of the first documents and second documents identified for the topic 213. Links or references to the video content or audio content identified for the topic 213 may also be inserted into the template 237, along with contact information for the one or more experts 270 identified for the topic 213.

FIG. 8 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 8, an exemplary system for implementing aspects described herein includes a computing device, such as computing device 800. In its most basic configuration, computing device 800 typically includes at least one processing unit 802 and memory 804. Depending on the exact configuration and type of computing device, memory 704 may be volatile (such as random access memory (RAM)), non-volatile (such as read-only memory (ROM), flash memory, etc.), or some combination of the two. This most basic configuration is illustrated in FIG. 8 by dashed line 806.

Computing device 800 may have additional features/functionality. For example, computing device 800 may include additional storage (removable and/or non-removable) including, but not limited to, magnetic or optical disks or tape. Such additional storage is illustrated in FIG. 8 by removable storage 808 and non-removable storage 810.

Computing device 800 typically includes a variety of computer readable media. Computer readable media can be any available media that can be accessed by the device 800 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 804, removable storage 808, and non-removable storage 810 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media may be part of computing device 800.

Computing device 800 may contain communication connection(s) 812 that allow the device to communicate with other devices. Computing device 800 may also have input device(s) 814 such as a keyboard, mouse, pen, voice input device, touch input device, etc. Output device(s) 816 such as a display, speakers, printer, etc. may also be included. All these devices are well known in the art and need not be discussed at length here.

In an implementation, a system for selecting topics based on technical support data and for generating topic pages for each selected topic using documents from a first entity and documents from a second entity is provided. The system comprises at least one computing device, and a support database associated with a first entity, wherein the support database comprises a plurality of records, and each record is associated with a topic of a plurality of topics; and a topic engine. The topic engine is adapted to: rank the topics of the plurality of topics based on the records of the support database, and select a subset of the topics of the plurality of topics based on the ranking. The topic engine is further adapted to, for each topic of the subset of topics: identify one or more first documents corresponding to the topic, wherein the one or more first documents are associated with the first entity; identify one or more second documents corresponding to the topic, wherein the one or more second documents are associated with a second entity; and generate a topic page for the topic using content from the identified one or more first documents and content from the identified one or more second document. The topic engine is further adapted to provide each of the generated topic pages to a search engine through a network.

Implementations may include some or all of the following features. The support database may comprise a technical support database and each record may represent an interaction between the first entity and a user with respect to the topic corresponding to the record. The topic engine adapted to select the subset of topics of the plurality of topics based on the plurality of records may comprise the topic engine adapted to: for each topic, determine a number of records of the plurality of records that are associated with the topic; rank the topics of the plurality of topics based on the determined number of records; and select the subset of topics based on the ranking. The one or more first documents may comprise technical support documents published by the first entity.

In an implementation, a method for generating a topic page for a received topic using documents from a first entity and documents from a second entity is provided. The method comprises receiving a topic by a computing device through a network, wherein the topic is associated with a first entity; identifying one or more first documents corresponding to the topic by the computing device, wherein the one or more first documents are associated with the first entity; identifying one or more second documents corresponding to the topic by the computing device, wherein the one or more second documents are associated with a second entity; retrieving a template by the computing device, wherein the template comprises a first region and a second region; inserting content from the identified one or more first documents into the first region of the template by the computing device; inserting content from the identified one or more second documents into the second region of the template by the computing device; generating a topic page from the template by the computing device; and providing the generated topic page to a search engine through the network by the computing device.

Implementations may include some or all of the following features. The method may further comprise submitting the topic page for review to the first entity; receiving an indication that the topic page has been approved; and providing the generated topic page to the search engine in response to the received indication. The one or more second documents may comprise one or more documents published by the second entity, or forum posts associated with the second entity. The topic page may be generated using one or more of an XML schema or a schema.org schema. The one or more first documents may comprise technical support documents published by the first entity. The topic may comprise a technical support issue. The template may comprise a third region, and the method may further comprise determining one or more of video content or audio content associated with the topic; and inserting the determined one or more of video content or audio content associated with the topic into the third region of the template. The template may comprise a third region, and the method may further comprise determining one or more experts associated with the topic, and inserting contact information associated with the determined one or more experts into the third region of the template.

In an implementation, a method for selecting topics based on technical support data and for generating topic pages for each selected topic using documents from a first entity and documents from a second entity is provided. The method comprises receiving a support database by a computing device through a network, wherein the support database comprises a plurality of records, each record is associated with a topic of a plurality of topics, and the support database is associated with a first entity; and selecting a subset of the topics of the plurality of topics based on the plurality of records by the computing device. The method further comprises, for each topic of the subset of the plurality of topics: identifying one or more first documents corresponding to the topic by the computing device, wherein the one or more first documents are associated with the first entity; identifying one or more second documents corresponding to the topic by the computing device, wherein the one or more second documents are associated with a second entity; and generating a topic page for the topic using content from the identified one or more first documents and content from the identified one or more second documents by the computing device. The method further comprises providing each of the generated topic pages to a search engine through the network by the computing device.

Implementations may include some or all of the following features. The support database may comprise a technical support database and each record may represent an interaction between the first entity and a user with respect to the topic associated with the record. Selecting the subset of the topics of the plurality of topics based on the plurality of records may comprise: for each topic, determining a number of records of the plurality of records that are associated with the topic; ranking the topics of the plurality of topics based on the determined number of records; and selecting the subset of topics based on the ranking. Selecting the subset of the topics of the plurality of topics based on the plurality of records may comprise: receiving search data related to each topic, wherein the search data comprises queries, and each query is associated with a topic of the plurality of topics; for each topic, determining a number of queries that are associated with the topic from the search data; ranking the topics of the plurality of topics based on the determined number of queries; and selecting the subset of topics based on the ranking. The one or more first documents may comprise technical support documents published by the first entity.

The one or more second documents may comprise one or more of documents published by the second entity, or forum posts associated with the second entity. Generating a topic page for the topic using content from the identified one or more first documents and content from the identified one or more second documents may comprise: retrieving a template, wherein the template comprises a first region and a second region; inserting the content from the identified one or more first documents into the first region of the template; inserting the content from the identified one or more second documents into the second region of the template; and generating the topic page from the template. The topic page may be generated using one or more of an XML schema or a schema.org schema.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer system comprising one or more processors executing computer-executable instructions which configure the computer system with an architecture for a topic engine that generates topic pages used to structure a search result for a database query of a given entity rather than merely assembling links to websites in order to facilitate better control over content presented in the search results, the architecture of the computer system comprising:
   a selection engine that selects a set of topics based on internal data of the given entity, wherein the internal data comprises records each representing an interaction between the given entity and a user who is making an inquiry directed to the given entity, wherein each record identifies terms or phrases relating to the inquiry, and wherein selection of the set of topics is at least based on one or both of ranking the records according to a number of records relating to a topic, and topics that have more than a threshold number of records relating to them;
   a collection engine that performs the following for each topic in the set of selected topics:
      collects data from the internal data of the given entity and from external data from one or more entities other than the given entity; and
      aggregates the collected data to produce aggregated topic data based on relationships between the topics in the selected set of topics, wherein the relationships comprise records indicating the internal data and any external data that includes content for the aggregated topic data for any of the topics in the set of selected topics;
   a topic page generation engine that performs the following for the aggregated topic data for each topic in the set of selected topics:
      combines the aggregated topic data for one or more topics of the set of selected topics using a template that comprises a schema configured to refer to one or more first documents contained in the internal data of the given entity and any second documents contained in the external data of the one or more entities other than the given entity; and
      based on each template, generates a topic page from which content is used to structure a search result for a database query of the given entity rather than merely assembling links to websites, in order to facilitate better control over content presented in the search results; and
   a publication engine that provides the generated topic pages for topics in the set of selected topics to one or more search engines.

2. The system of claim 1, wherein the internal data of the given entity comprises a technical support database and wherein each record represents an interaction between the given entity and the user with respect to an inquiry regarding technical support from the given entity.

3. The system of claim 1, wherein the one or more first documents comprise technical support documents published by the given entity.

4. The system of claim 1, wherein generated topic pages relate to one or more inquiries for technical support from the given entity, and wherein the one or more second documents comprise technical support documents, emails, or websites related to related to the inquiries.

5. A computer-implemented method for generating topic pages used to structure a search result for a database query in a manner that facilitates better control over content presented in the search results, the computer-implemented method being performed by one or more processors executing computer-executable instructions for the computer-implemented method, which comprises:
   selecting a set of topics based on internal data of the given entity, wherein the internal data comprises records each representing an interaction between the given entity and a user who is making an inquiry directed to the given entity, wherein each record identifies terms or phrases relating to the inquiry, and wherein selecting the set of topics is at least based on one or both of ranking the records according to a number of records relating to a topic, and topics that have more than a threshold number of records relating to them;
   for each topic in the set of selected topics performing at least the following:
      collecting data from the internal data of the given entity and from external data from one or more entities other than the given entity; and
      aggregating the collected data to produce aggregated topic data based on relationships between the topics in the selected set of topics, wherein the relationships comprise records indicating the particular internal data and any external data that includes content for the aggregated topic data for any of the topics in the set of selected topics;
   for the aggregated topic data for each topic in the set of selected topics performing at the following:
      combining the aggregated topic data for one or more topics of the set of selected topics using a template that comprises a schema configured to refer to one or more first documents contained in the internal data of the given entity and any second documents contained in the external data of the one or more entities other than the given entity; and based on each template, generating a topic page from which content is used to structure a search result for a database query of the given entity rather than merely assembling links to websites, in order to facilitate better control over content presented in the search results; and providing the generated topic pages for topics in the set of selected topics to one or more search engines.

6. The computer-implemented method of claim 5, further comprising:

submitting one or more of the generated topic pages for review to the given entity;

receiving an indication that the one or more submitted topic pages have been approved; and providing the one or more approved topic pages to the one or more search engines.

7. The computer-implemented method of claim 5, wherein the one or more second documents comprise one or more documents published by the one or more entities other than the given entity, or forum posts associated with the one or more entities other than the given entity.

8. The computer-implemented method of claim 5, wherein the schema comprises an XML schema or a schema.org schema.

9. The computer-implemented method of claim 5, wherein the internal data of the given entity comprises a technical support database and wherein each record represents an interaction between the given entity and the user with respect to an inquiry regarding technical support from the given entity.

10. The computer-implemented method of claim 9, wherein the one or more first documents comprise technical support documents published by the given entity.

11. The computer-implemented method of claim 10, wherein the template comprises one or more references to video content or audio content associated with at least one of the one or more topics of the set of selected topics.

12. The computer-implemented method of claim 9, wherein the template comprises one or more references to one or more experts associated with at least one of the one or more topics of the set of selected topics.

13. A computer-implemented method for generating topic pages used to structure a search result for a database query in a manner that facilitates better control over content presented in search results for technical support data of a given entity, the computer-implemented method being performed by one or more processors executing computer-executable instructions for the computer-implemented method, which comprises:

selecting a set of topics based on internal technical data sources of the given entity, wherein the internal technical data sources comprise one or more of internal support data, internal search data, and wherein the internal support data and internal search data comprise records each representing an interaction between the given entity and a user who is making an inquiry for technical support directed to the given entity, wherein each record identifies terms or phrases relating to the inquiry, and wherein selecting the set of topics is at least based on one or both of ranking the records according to a number of records relating to a topic, and topics that have more than a threshold number of records relating to them;

for each topic in the set of selected topics performing at least the following:

collecting data from the internal technical data sources of the given entity and from external data sources from one or more entities other than the given entity; and aggregating the collected data to produce aggregated topic data based on relationships between the topics in the selected set of topics, wherein the relationships comprise records indicating the particular internal data source and any external data source that includes content for the aggregated topic data for any of the topics in the set of selected topics;

for the aggregated topic data for each topic in the set of selected topics performing at the following:

combining the aggregated topic data for one or more topics of the set of selected topics using a template that comprises a schema configured to refer to one or more first documents contained in the internal data of the given entity and any second documents contained in the external data of the one or more entities other than the given entity; and based on each template, generating a topic page from which content is used to structure a search result for a database query of the given entity rather than merely assembling links to websites, in order to facilitate better control over content presented in the search results; and providing the generated topic pages for topics in the set of selected topics to one or more search engines.

14. The computer-implemented method of claim 13, wherein selecting the set of the topics is based on both ranking the records according to the number of records relating to a topic, and topics that have more than a threshold number of records relating to them.

15. The computer-implemented method of claim 13, wherein selecting the set of the topics is based on ranking the records according to the number of records relating to a topic.

16. The computer-implemented method of claim 13, wherein selecting the set of the topics is based on topics that have more than a threshold number of records relating to them.

17. The computer-implemented method of claim 13, wherein the one or more first documents comprise technical support documents published by the given entity.

18. The computer-implemented method of claim 13, wherein the one or more second documents comprise one or more documents published by the one or more entities other than the given entity, or forum posts associated with the one or more entities other than the given entity.

19. The computer-implemented method of claim 13, wherein the template comprises a first region and a second region, and wherein the one or more first documents are inserted into the first region of the template, and the one or more second documents are inserted into the second region of the template.

20. The method of claim 19, wherein the schemas comprises an XML schema or a schema.org schema.

* * * * *